US010011338B2

(12) United States Patent
Teal et al.

(10) Patent No.: US 10,011,338 B2
(45) Date of Patent: Jul. 3, 2018

(54) PIVOTING FOOT PLATFORM FOR ELLIPTICAL APPARATUS

(71) Applicant: PT Motion Works, Inc., Solana Beach, CA (US)

(72) Inventors: Brent C. Teal, Solana Beach, CA (US); Bryan L. Pate, Atherton, CA (US)

(73) Assignee: PT MOTION WORKS, INC., Solana Beach, CA (US)

( * ) Notice: Subject to any disclaimer, the term of this patent is extended or adjusted under 35 U.S.C. 154(b) by 0 days.

(21) Appl. No.: 15/366,436

(22) Filed: Dec. 1, 2016

(65) Prior Publication Data
US 2017/0158301 A1   Jun. 8, 2017

Related U.S. Application Data

(60) Provisional application No. 62/263,981, filed on Dec. 7, 2015.

(51) Int. Cl.
| | | |
|---|---|---|
| *B63H 16/20* | (2006.01) | |
| *A63B 22/06* | (2006.01) | |
| *B63B 35/73* | (2006.01) | |
| *B62K 3/00* | (2006.01) | |
| *B62M 1/36* | (2013.01) | |
| *A63B 22/00* | (2006.01) | |
| *A63B 22/16* | (2006.01) | |

(52) U.S. Cl.
CPC ......... *B63H 16/20* (2013.01); *A63B 22/0046* (2013.01); *A63B 22/0664* (2013.01); *A63B 22/16* (2013.01); *B62K 3/002* (2013.01); *B62M 1/36* (2013.01); *B63B 35/73* (2013.01); *A63B 2022/0688* (2013.01)

(58) Field of Classification Search
CPC ........ B63H 16/00; B63H 16/12; B63H 16/20; B63B 7/085; B63B 35/73; A63B 21/06; A63B 22/00; A63B 21/4034; A63B 21/4047; A63B 22/0664
USPC ................................................ 440/21, 26, 32
See application file for complete search history.

(56) References Cited

U.S. PATENT DOCUMENTS

| | | | | |
|---|---|---|---|---|
| 5,088,944 A | * | 2/1992 | Kats ......................... | B63B 35/73 440/26 |
| 5,308,268 A | * | 5/1994 | Schmid ................... | B63H 16/14 440/21 |

(Continued)

FOREIGN PATENT DOCUMENTS

EP        2647561 A1    10/2013

OTHER PUBLICATIONS

International Search Report and Written Opinion for International application No. PCT/US2016/065000 dated Mar. 7, 2017.

*Primary Examiner* — Lars A Olson
(74) *Attorney, Agent, or Firm* — Procopio Cory Hargreaves and Savitch LLP

(57) ABSTRACT

An apparatus including a frame; a drive wheel coupled to the frame; first and second foot links operably coupled to said drive wheel to transfer power to said drive wheel so as to propel the apparatus; and each of said first and second foot links including a pivoting foot platform for receiving an operator's foot, said pivoting foot platform pivotally coupled to one of said first and second foot links so as to allow angular travel of the pivoting foot platform, the apparatus including one or more features to limit the angular travel of said pivoting foot platform.

23 Claims, 12 Drawing Sheets

(56) References Cited

U.S. PATENT DOCUMENTS

| | | | |
|---|---|---|---|
| 6,312,365 B1 | 11/2001 | Koenig | |
| 6,802,797 B2 * | 10/2004 | Maresh | A63B 22/0007 |
| | | | 482/52 |
| 8,408,954 B2 | 4/2013 | Sturm | |
| 2005/0248117 A1 | 11/2005 | Hung | |
| 2007/0235974 A1 | 10/2007 | Vargas | |

* cited by examiner

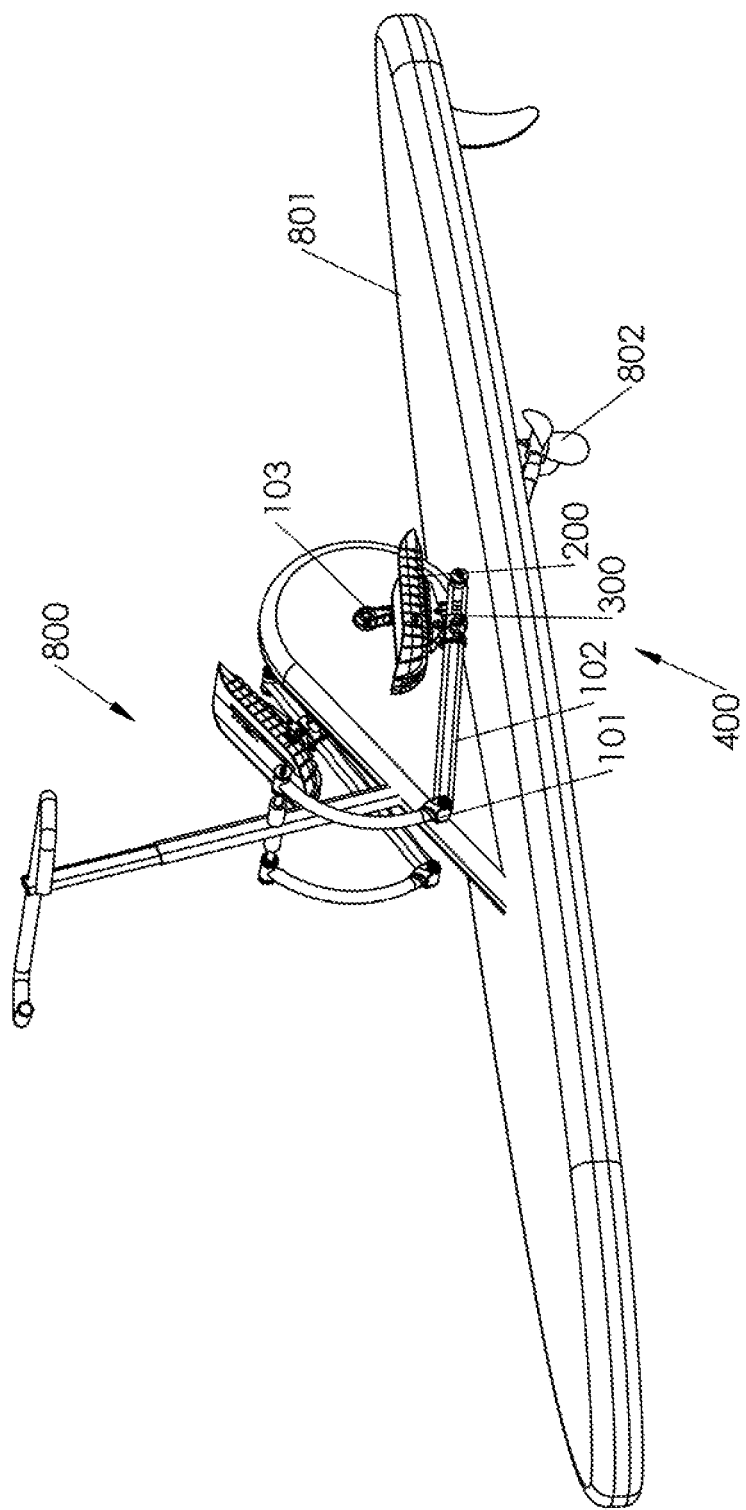

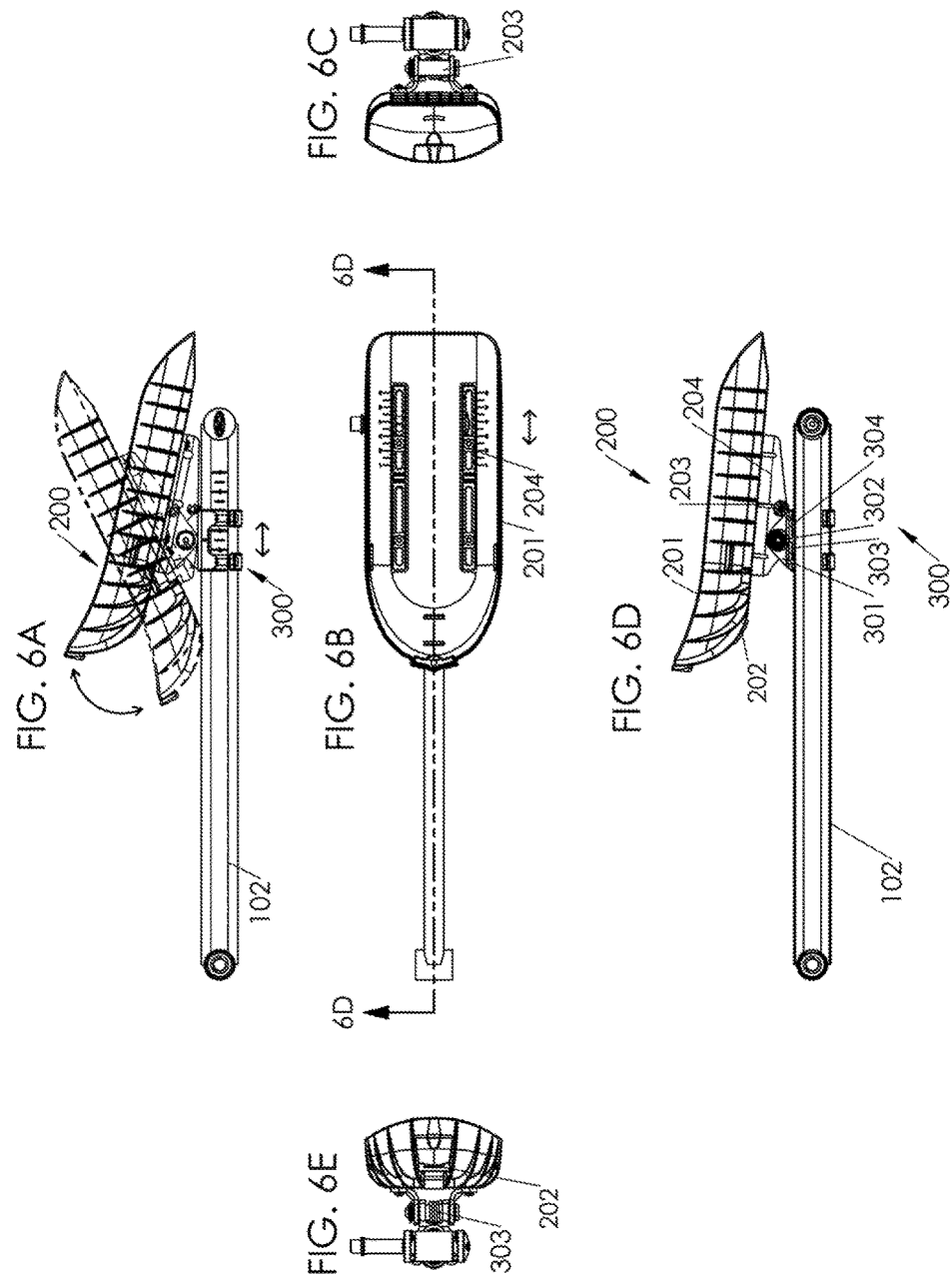

PIVOTING FOOT PLATFORM FOR ELLIPTICAL APPARATUS

CROSS REFERENCE TO RELATED APPLICATION

This application claims the benefit of prior provisional patent application No. 62/263,981, filed Dec. 7, 2015, which is incorporated by reference herein.

BACKGROUND

Field of the Invention

The present invention relates generally to elliptical cycles, and particularly to foot platforms of elliptical cycles and other elliptical apparatuses.

Related Art

An elliptical cycle operates by the user standing atop foot platforms and using his legs to stride forward and rearward in a generally elliptical or ovate path causing the rear wheel to rotate and propel the elliptical cycle. Many different versions of the elliptical cycle are known in the art, employing different mechanisms to transfer power from the user to the rear wheel. For example, in one version of an elliptical cycle, an elliptical or ovate path is created by a slider crank mechanism comprised of guide tracks, drive arms and crank arms where a rear end of each drive arm is attached to a corresponding crank arm and a front end of each drive arm is attached to one or more load wheels situated on guide tracks that are attached to a frame of the elliptical cycle. When a user strides, the crank arms rotate in a generally circular motion and the load wheels at the front of each drive arm to reciprocate linearly along the guide tracks, producing an elliptical or ovate motion at the foot platforms. This motion is passed through a transmission system that results in a rear wheel turning. The most common version of an elliptical cycle is known as a "rear-drive" elliptical cycle because the crank system is located to the rear of the rider. The most common propulsion mechanism used by rear-drive elliptical cycles is the slider crank mechanism described above. Another version of a rear-drive elliptical cycle is one that uses a rocker crank mechanism. In this version, the guide tracks and load wheels are replaced by rocker arms that attach to the frame at one end and to the front of the drive arms at the other. When the user strides, the crank arms move in a circle and the rocker arms reciprocate along an arc to produce a generally elliptical or ovate motion at the foot platforms.

One feature common to the different versions of rear-drive elliptical cycles known in the art is that the foot platform is rigidly attached to the drive arm. This means that on these devices, the rider's foot angle is determined by the angle of the drive arm throughout the pedaling stroke.

SUMMARY

An aspect of the invention involves a pivoting foot platform on a rear-drive elliptical cycle. The pivoting foot platform allows for the use of a shorter drive arm than would be possible with a fixed foot platform to achieve a desired generally elliptical or ovate foot path. The shorter drive arm enables a reduction in the overall length of the elliptical cycle's frame with a corresponding reduction in weight and cost.

The pivoting foot platform includes a foot platform, a pivot and a mechanism to attach the pivoting platform to the drive arm. The foot platform may be fixed relative to the pivot location or adjustable with respect to the pivot location. Similarly, the pivot location may be fixed to the drive arm or configured so that the pivot location can be adjusted along the drive arm.

For a rear-drive elliptical cycle, the foot path is determined by the drive arm length, the foot platform position on the drive arm, the crank arm length, the rocker arm length (if a rocker crank mechanism) and the crank pivot offset from the reciprocating axis. Adjusting one or more of these factors will change the foot path. The ideal design usually involves setting these factors to provide the most comfortable and power-efficient foot path possible while minimizing the size of the frame.

Human anatomy limits the range of foot angles that are viable for powering an elliptical cycle. Extreme foot platform angles can be uncomfortable for the elliptical cycle rider. If the angle is too extreme at the top of the power stroke, it can put undue stress on the rider's knee and ankle joints. If the angle is too extreme at the bottom of the power stroke, it can aggravate the rider's Achilles tendon. Over time, either of these extremes can lead to injuries. For a rear-drive elliptical cycle with fixed foot platforms attached directly to the drive arm, the pedal angle during the pedal stroke is determined by the drive arm angle. In turn, the drive arm angle during the pedal stroke is directly related to the length of the drive arm, the length of the crank arm to which it is attached and the crank pivot offset from the reciprocating axis. For a given crank arm length and crank pivot offset, shortening the drive arm increases the drive arm angles at both the top and bottom of the power stroke. For a given crank arm length and drive arm length, reducing the crank pivot offset decreases the drive arm angles at both the top and bottom of the power stroke. As a result, for elliptical cycles with rigid platforms, there is a minimum drive arm length that is viable for a given crank arm length and crank pivot offset. By using a pivoting foot platform, this minimum drive arm length can be shortened because the angle of the elliptical cycle rider's foot is decoupled from the angle of the drive arm. This enables the rider to dynamically determine his foot angle throughout the pedal stroke and choose a comfortable angle when the drive arm angle at either the top or the bottom of the pedal stroke would be too extreme to be comfortable with a fixed foot platform. The drive arm length impacts the overall length of an elliptical cycle and the size of the frame. Shortening the drive arms can allow for the use of a smaller frame, which can result in significant cost savings for the manufacturer.

One embodiment of the pivoting foot platform provides for forward and/or rearward limits to the range of motion for the foot platform. These features provide several advantages for the rider, including ensuring that the foot platform is always oriented in a position to conveniently accept the rider's foot when mounting the cycle, providing a means to stabilize the pedal platform while the rider is coasting, and allowing the rider to engage different muscle groups by powering through his heel and/or toe directly onto the drive arm while riding. These range of motion limits can be made of a hard material or improved by making them out of a compliant material such as rubber, or a spring and/or a damper or a combination thereof to reduce noise and soften impact. The range of motion limits can also be adjustable so that the rider can customize the range of motion best suited for their purposes. One or both of the range of motion limits can also be locked out in order to disable travel in the forward, backward or both directions. These range of motion limits can be placed on the drive arm, the foot platform, foot platform pivot assembly or any combination of the three.

The pivoting foot platform could also incorporate a spring return to further improve predictable foot platform presentation within the limits.

Another aspect of the invention involves an apparatus including a frame; a drive wheel coupled to the frame; first and second foot links operably coupled to said drive wheel to transfer power to said drive wheel so as to propel the apparatus; and each of said first and second foot links including a pivoting foot platform for receiving an operator's foot, said pivoting foot platform pivotally coupled to one of said first and second foot links so as to allow angular travel of the pivoting foot platform, the apparatus including one or more features to limit the angular travel of said pivoting foot platform.

One or more implementations of the aspect of the invention described immediately above includes one or more of the following: each of said pivoting foot platforms is selectively positionable along corresponding first and second foot links; said pivoting foot platform includes an upper portion configured to come in contact with an operator's foot and a lower portion which is in contact with corresponding first and second foot links and the upper portion of the pivoting foot platform is selectively positionable in more than one position relative to the lower portion of the pivoting foot platform; said pivoting foot platform includes an upper portion which is configured to come in contact with an operator's foot and a lower portion which is in contact with corresponding first and second foot links and the upper portion of the pivoting foot platform is selectively positionable in more than one position relative to the lower portion of the pivoting foot platform;

An additional aspect of the invention involves an apparatus including a frame; a drive wheel coupled to the frame; first and second foot links operably coupled to said drive wheel to transfer power to said drive wheel so as to propel the apparatus; and each of said first and second foot links including a pivoting foot platform for receiving an operator's foot, said pivoting foot platform pivotally coupled to one of said first and second foot links so as to allow angular travel of the pivoting foot platform, and said pivoting foot platform is selectively positionable in more than one location along corresponding first and second foot links.

One or more implementations of the aspect of the invention described immediately above includes one or more of the following: said pivoting foot platform includes an upper portion configured to come in contact with an operator's foot and a lower portion which is in contact with corresponding first and second foot links and the upper portion of the pivoting foot platform is selectively positionable in more than one position relative to the lower portion of the pivoting foot platform.

A further aspect of the invention involves an apparatus including a frame; a drive wheel coupled to the frame; first and second foot links operably coupled to said drive wheel to transfer power to said drive wheel so as to propel the apparatus; and each of said first and second foot links including a pivoting foot platform for receiving an operator's foot, said pivoting foot platform pivotally coupled to one of said first and second foot links so as to allow angular travel of the pivoting foot platform, and said pivoting foot platform includes an upper portion which is configured to come in contact with the operator's foot and a lower portion which is in contact with corresponding first and second foot links and the upper portion of the pivoting foot platform is selectively positionable in more than one position relative to the lower portion of the pivoting foot platform.

A still further aspect of the invention involves an apparatus including a frame having a drive wheel rotatably supported thereupon, and a pivot axis defined thereupon; first and second foot links, each of said first and second foot links having a first end, a second end, a pivoting foot receiving platform that is pivotally coupled to one of said first and second foot links so as to allow angular travel of the pivoting foot platform, and one or more features to limit the angular travel of said pivoting foot receiving platform; a coupler assembly which is in mechanical communication with said pivot axis and with a first end of each of said first and second foot links, said coupler assembly being operative to direct said first ends of said first and second foot links in an arcuate path of travel; a foot link guide supported by said frame, said guide being operable to engage a second end of each of said first and second foot links, and to direct said second ends along a reciprocating path of travel; and a power transfer linkage in mechanical communication with said coupler assembly and with said drive wheel; whereby when the first end of one of said first and second foot links travels in said arcuate path and the second end of that first and second foot links travels in said reciprocal path, an operator's foot supported thereupon travels in a generally elliptical path of travel, and said power transfer linkage transfers power from said coupler assembly to said drive wheel, so as to supply propulsive power thereto.

One or more implementations of the aspect of the invention described immediately above includes one or more of the following: said pivoting foot platform can be selectively positioned in more than one location along corresponding first and second foot links; said pivoting foot platform includes an upper portion which is configured to come in contact with the operator's foot and a lower portion which is in contact with corresponding first and second foot links and the upper portion of the pivoting foot platform is selectively positionable in more than one position relative to the lower portion of the pivoting foot platform; and said pivoting foot platform includes an upper portion which is configured to come in contact with the operator's foot and a lower portion which is in contact with corresponding first and second foot links and the upper portion of the pivoting foot platform is selectively positionable in more than one position relative to the lower portion of the pivoting foot platform.

An additional aspect of the invention involves an apparatus including a frame having a drive wheel rotatably supported thereupon, and a pivot axis defined thereupon; first and second foot links, each of said first and second foot links having a first end, a second end, a pivoting foot receiving platform that is pivotally coupled to one of said first and second foot links so as to allow angular travel of the pivoting foot platform, and said pivoting foot platform is selectively positionable in more than one location along corresponding first and second foot links; a coupler assembly which is in mechanical communication with said pivot axis and with a first end of each of said first and second foot links, said coupler assembly being operative to direct said first ends of said first and second foot links in an arcuate path of travel; a foot link guide supported by said frame, said guide being operable to engage a second end of each of said first and second foot links, and to direct said second ends along a reciprocating path of travel; a power transfer linkage in mechanical communication with said coupler assembly and with said drive wheel; whereby when the first end of one of said first and second foot links travels in said arcuate path and the second end of one of said first and second foot links travels in said reciprocal path, an operator's foot supported thereupon travels in a generally elliptical path of travel, and said power transfer linkage transfers power from said coupler assembly to said drive wheel, so as to supply propulsive power thereto.

One or more implementations of the aspect of the invention described immediately above includes one or more of the following: said pivoting foot platform includes an upper portion which is in contact with the operator's foot and a lower portion which is in contact with corresponding first and second foot links and the upper portion of the pivoting foot platform is selectively positionable in more than one position relative to the lower portion of the pivoting foot platform.

An additional aspect of the invention involves an apparatus including a frame having a drive wheel rotatably supported thereupon, and a pivot axis defined thereupon; first and second foot links, each of said first and second foot links having a first end, a second end, a pivoting foot receiving platform that is pivotally coupled to one of said first and second foot links so as to allow angular travel of the pivoting foot platform, and said pivoting foot platform includes an upper portion which is configured to come in contact with the operator's foot and a lower portion which is in contact with a corresponding foot link and the upper portion of the pivoting foot platform is selectively positionable in more than one position relative to the lower portion of the pivoting foot platform; a coupler assembly which is in mechanical communication with said pivot axis and with a first end of each of said first and second foot links, said coupler assembly being operative to direct said first ends of said first and second foot links in an arcuate path of travel; a foot link guide supported by said frame, said guide being operable to engage a second end of each of said first and second foot links, and to direct said second ends along a reciprocating path of travel; a power transfer linkage in mechanical communication with said coupler assembly and with said drive wheel; whereby when the first end of one of said first and second foot links travels in said arcuate path and the second end of one of said first and second foot links travels in said reciprocal path, an operator's foot supported thereupon travels in a generally elliptical path of travel, and said power transfer linkage transfers power from said coupler assembly to said drive wheel, so as to supply propulsive power thereto.

Another additional aspect of the invention involves an apparatus including a floating structure suitable for use as a water-borne craft; a propulsion mechanism coupled to the floating structure; first and second foot links operably coupled to the propulsion mechanism to transfer power to said propulsion mechanism so as to propel the apparatus; each of said first and second foot links including a pivoting foot platform for receiving an operator's foot, said pivoting foot receiving platform pivotally coupled to one of said first and second foot links so as to allow angular travel of the pivoting foot platform.

One or more implementations of the aspect of the invention described immediately above includes one or more of the following: the apparatus includes one or more features to limit the angular travel of said pivoting foot platform; said pivoting foot platform is selectively positionable in more than one location along corresponding first and second foot links; said pivoting foot platform includes an upper portion which is configured to come in contact with the operator's foot and a lower portion which is in contact with corresponding first and second foot links and the upper portion of the pivoting foot platform is selectively positionable in more than one position relative to the lower portion of the pivoting foot platform; said pivoting foot platform includes an upper portion which is configured to come in contact with the operator's foot and a lower portion which is in contact with corresponding first and second foot links and the upper portion of the pivoting foot platform is selectively positionable in more than one position relative to the lower portion of the pivoting foot platform; said pivoting foot platform is selectively positionable in more than one location along corresponding first and second foot links; said pivoting foot platform includes an upper portion which is configured to come in contact with the operator's foot and a lower portion which is in contact with corresponding first and second foot links and the upper portion of the pivoting foot platform is selectively positionable in more than one position relative to the lower portion of the pivoting foot platform; and the apparatus includes one or more features to limit the angular travel of said pivoting foot platform.

A further aspect of the invention involves an apparatus including a floating structure suitable for use as a water-borne craft; a propulsion mechanism coupled to the floating structure; first and second foot links operably coupled to the propulsion mechanism to transfer power to said propulsion mechanism so as to propel the apparatus; each of said first and second foot links including a foot platform for receiving an operator's foot and selectively positionable in more than one location along corresponding first and second foot links.

A still further aspect of the invention involves an apparatus including a floating structure suitable for use as a water-borne craft with a pivot axis defined thereupon; a propulsion mechanism coupled to the floating structure; first and second foot links, each of said first and second foot links having a first end, a second end and a foot receiving portion defined thereupon; a coupler assembly that is in mechanical communication with said pivot axis and with a first end of each of said first and second foot links, said coupler assembly being operative to direct said first ends of said first and second foot links in an arcuate path of travel; a foot link guide supported by said frame, said guide being operable to engage a second end of each of said first and second foot links, and to direct said second ends along a reciprocating path of travel; a power transfer linkage in mechanical communication with said coupler assembly and with said propulsion mechanism, whereby when the first end of one of said first and second foot links travels in said arcuate path and the second end of one of said first and second foot links travels in said reciprocal path, an operator's foot supported thereupon travels in a generally elliptical path of travel, and said power transfer linkage transfers power from said coupler assembly to said propulsion mechanism, so as to supply propulsive power thereto.

One or more implementations of the aspect of the invention described immediately above includes one or more of the following: said foot receiving portion on each foot link includes a pivoting foot platform for receiving an operator's foot, said pivoting foot receiving platform pivotally coupled to one of said first and second foot links so as to allow angular travel of the pivoting foot platform; the apparatus includes one or more features to limit the angular travel of said pivoting foot platform; said pivoting foot platform is selectively positionable in more than one location along corresponding first and second foot links; said pivoting foot platform includes an upper portion which is in contact with the operator's foot and a lower portion which is in contact with a corresponding foot link and the upper portion of the pivoting foot platform is selectively positionable in more than one position relative to the lower portion of the pivoting foot platform; said pivoting foot platform includes an upper portion which is in contact with the operator's foot and a lower portion which is in contact with corresponding first and second foot links and the upper portion of the pivoting foot platform is selectively positionable in more than one position relative to the lower portion of the pivoting foot platform; said pivoting foot platform is selectively positionable in more than one location along corresponding first and second foot links; said pivoting foot platform includes an upper portion which is in contact with the operator's foot and a lower portion which is in contact with corresponding first and second foot links and the upper portion of the pivoting foot platform is selectively positionable in more than one position relative to the lower portion of the pivoting foot platform; said pivoting foot platform includes an upper portion which is in contact with the operator's foot and a lower portion which is in contact with a corresponding first and second foot links and the upper portion of the pivoting foot platform is selectively positionable in more than one position relative to the lower portion of the pivoting foot platform; and said pivoting foot platform is selectively positionable in more than one location along corresponding first and second foot links.

An additional aspect of the invention involves an apparatus including a frame having a pivot axis defined thereon, the frame configured to be supported on a floor; first and second foot links, each of said first and second foot links including a first end, a second end and a pivoting foot receiving platform, said pivoting foot receiving platform pivotally coupled to one of said first and second foot links so as to allow angular travel of the pivoting foot platform, each of said pivoting foot platforms is selectively positionable in more than one location along corresponding first and second foot links; a coupler assembly that is in mechanical communication said pivot axis and with the first end of each of said first and second foot links, said coupler assembly being operative to guide the first end of each of said first and second foot links in an arcuate path of travel; a guide supported by the frame that is in mechanical communication with the second end of each of said first and second foot links, said guide being operative to guide the second end of each foot link along a reciprocating path of travel; whereby when the operator engages said foot receiving platforms on said first and second foot links, the first end of each of said first and second foot links travels in an arcuate path and the second end of each of said first and second foot links travels in a reciprocating path, resulting in the operator's foot traveling in one of an elliptical path and an ovate path.

One or more implementations of the aspect of the invention described immediately above includes one or more of the following: the apparatus includes one or more features to limit the angular travel of said pivoting foot platform; said pivoting foot platform includes an upper portion which is in contact with the operator's foot and a lower portion which is in contact with corresponding first and second foot links and the upper portion of the pivoting foot platform is selectively positionable in more than one position relative to the lower portion of the pivoting foot platform; and said pivoting foot platform includes an upper portion which is in contact with the operator's foot and a lower portion which is in contact with corresponding first and second foot links and the upper portion of the pivoting foot platform is selectively positionable in more than one position relative to the lower portion of the pivoting foot platform.

An additional aspect of the invention involves an apparatus including a frame having a pivot axis defined thereon, the frame configured to be supported on a floor; first and second foot links, each of said first and second foot links including a first end, a second end and a pivoting foot receiving platform, said pivoting foot receiving platform pivotally coupled to one of said first and second foot links so as to allow angular travel of the pivoting foot platform, said pivoting foot receiving platform including an upper portion configured to be in contact with an operator's foot and a lower portion which is in contact with corresponding first and second foot links, and the upper portion of the pivoting foot platform is selectively positionable in more than one position relative to the lower portion of the pivoting foot platform; a coupler assembly that is in mechanical communication said pivot axis and with the first end of each of said first and second foot links, said coupler assembly being operative to guide the first end of each of said first and second foot links in an arcuate path of travel; a guide supported by the frame that is in mechanical communication with the second end of each of said first and second foot links, said guide being operative to guide the second end of each of said first and second foot links along a reciprocating path of travel; whereby when the operator engages said foot receiving platforms on said first and second foot links, the first end of each of said first and second foot links travels in an arcuate path and the second end of each of said first and second foot links travels in a reciprocating path, resulting in the operator's foot traveling in one of an elliptical path and an ovate path.

One or more implementations of the aspect of the invention described immediately above includes one or more of the following: the apparatus includes one or more features to limit the angular travel of said pivoting foot platform.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 1D is a perspective view of an embodiment of a water-borne craft with a pivoting foot platform;

FIG. 6A is a side elevation view of one embodiment of a pivoting foot platform attached to a drive arm;

FIG. 6B is a top plan view of the pivoting foot platform and drive arm depicted in FIG. 6A;

FIG. 6C is a rear projection view of the pivoting foot platform and drive arm depicted in FIG. 6B;

FIG. 6D is a section view showing section D taken through FIG. 6B; and

FIG. 6E is a front projection view of the pivoting foot platform and drive arm depicted in FIG. 6B.

DETAILED DESCRIPTION

Figure 1A:
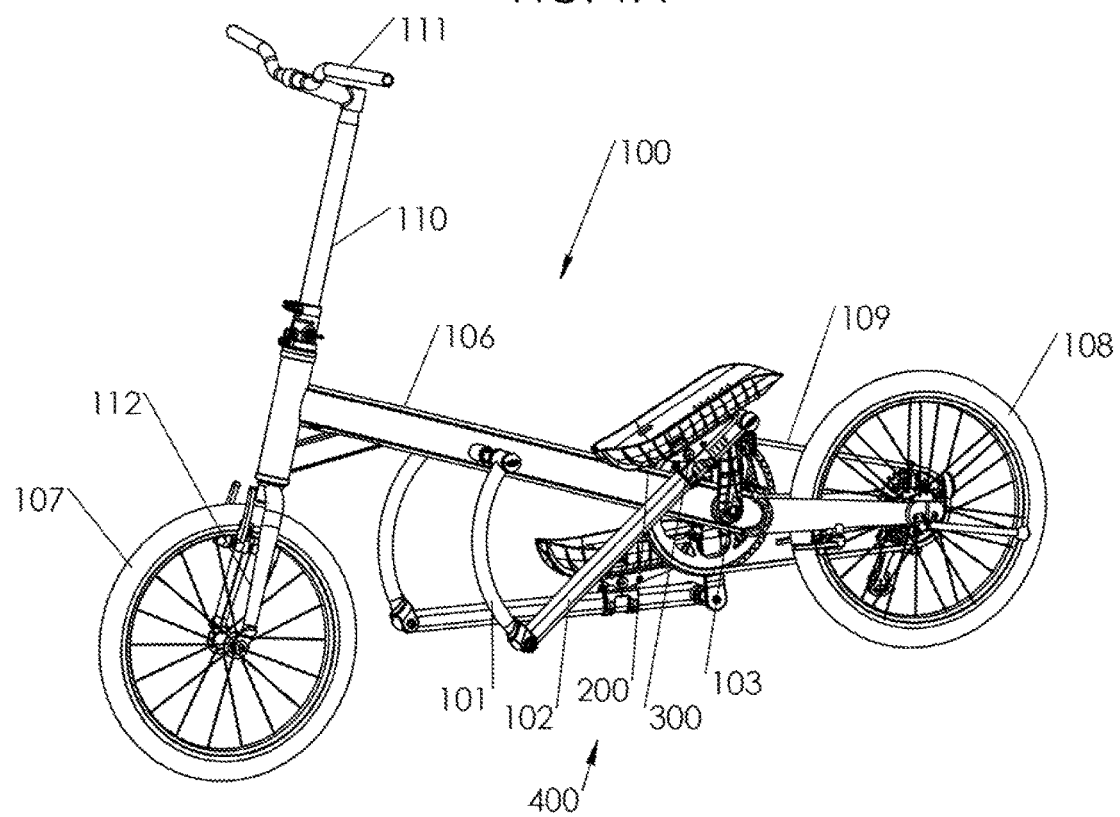
FIG. 1A is a perspective view of one embodiment of a rear-drive elliptical cycle with a rocker crank mechanism and a pivoting foot platform.

With reference to FIG. 1A, an embodiment of a rear-drive elliptical cycle 100 with short drive arms and pivoting foot platforms is shown. Before describing the pivoting foot platforms, the elliptical cycle will first be described. In alternative embodiments, the pivoting foot platforms are applied to other types of elliptically-driven human powered vehicles including, without limitation, elliptical cycles with two, three, or four wheels; elliptical cycles with arm levers in place of the handlebars; and elliptically driven watercraft (FIG. 1D). In a further embodiment, the pivoting foot platforms are applied to a stationary elliptical exercise machine (FIG. 1C) for commercial use and/or home use.

The elliptical cycle 100 includes a drive mechanism 400 mounted on a frame 106 on which one or more wheels (front wheel 107, rear/drive wheel 108) are mounted. Generally, the drive mechanism 400 comprises either a slider crank mechanism or a rocker crank mechanism. A drive mechanism 400 comprised of a rocker crank mechanism is depicted in FIG. 1A. In this embodiment, the rocker crank mechanism is comprised of a rocker arm or foot link guide 101 pivotally coupled to the frame 106, a drive arm or foot link 102 pivotally coupled to the rocker arm 101 and to a crank arm or coupler assembly 103, a foot platform pivot assembly 300 attached to the drive arm 102 and a foot platform assembly 200 attached to the foot platform pivot assembly 300. The drive mechanism 400 includes left leg/first and right leg/second drive mechanisms with corresponding first and second drive arms/foot links 102, crank arms/coupler assemblies 103, etc.

Figure 1B:
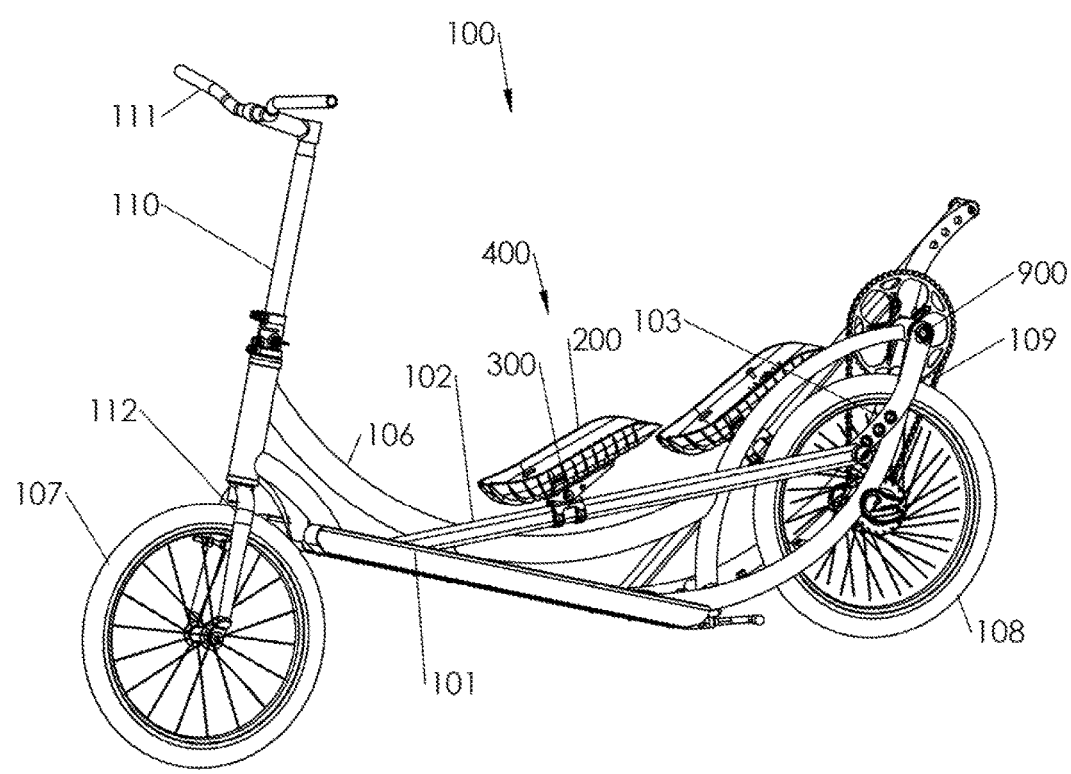
FIG. 1B is a perspective view of another embodiment of a rear-drive elliptical cycle with a slider crank mechanism and a pivoting foot platform.

An alternative embodiment of an elliptical cycle 100 employs a drive mechanism 400 comprised of a slider crank mechanism. A slider crank mechanism is comprised of a drive arm or foot link 102 movably coupled at its forward end to guide tracks or foot link guides 101 coupled to, or integral with, the frame 106 and pivotally coupled at its rear end to a crank arm 103, a foot platform pivot assembly 300 attached to the drive arm 102 and a foot platform assembly 200 attached to the foot platform pivot assembly 300. Such an embodiment is shown in FIG. 1B. Like reference numbers to the elements/features shown and/or described above and below with respect to FIGS. 1A and 2A-6D, the subject matter of which is incorporated herein, are shown in FIG. 1B. In this embodiment, the frame 106 has a drive wheel/rear wheel 108 rotatably supported thereupon, and a pivot axis 900 defined thereupon; a coupler assembly 103 which is in mechanical communication with the pivot axis 900 and with a first end of each of the first and second foot links/drive arms 102, the coupler assembly 103 being operative to direct the first ends of the first and second foot links 102 in an arcuate path of travel; a foot link guide 101 supported by the frame 106, the guide being operable to engage a second end of each of the first and second foot links 102, and to direct the second ends along a reciprocating path of travel; a power transmission or power transfer linkage 109 in mechanical communication with the coupler assembly 103 and with the drive wheel 108; whereby when the first end of one of the first and second foot links 102 travels in the arcuate path and the second end of that first and second foot links 102 travels in the reciprocal path, an operator's foot supported thereupon travels in a generally elliptical path of travel, and the power transfer linkage transfers power from the coupler assembly to the drive wheel 108, so as to supply propulsive power thereto.

The drive mechanism 400 includes left leg/first and right leg/second drive mechanisms with corresponding first and second drive arms/foot links 102, crank arms/coupler assemblies 103, etc. The front of the elliptical cycle includes the fork 112 rotatably mounted to the frame 106 and connected to the front wheel 106 and connected to the handlebars 111. This configuration allows the operator to steer the elliptical cycle 100.

The power transmission 109 connects the drive mechanism 400 to the rear wheel 108. During pedaling, the operator (not shown) uses his mass in a generally downward and rearward motion as in walking or jogging to exert a force on the foot platform assembly 200 and thereby, the drive arms 102. This force causes the rocker arm 101 to swing forward and then backward in an arc and the crank arms 103 to rotate in a circle. Through the power transmission 109 rotating the crank arms 103 causes the rear wheel 108 to rotate, providing propulsive power to the elliptical cycle.

In an alternative embodiment where the drive mechanism is a slider crank mechanism, as shown in FIG. 1B, the pedaling process exerts a force on the foot platform assembly 200 and thereby, the drive arms 102, causing the drive arms to slide downward and rearward along the guide tracks and the crank arms 103 to rotate in a circle. Through the power transmission 109 rotating the crank arms 103 causes the rear wheel 108 to rotate, providing propulsive power to the elliptical cycle.

The connection between the crank arms 103 and rear wheel 108 can be achieved by a number of mechanisms known in the art, including, without limitation, a chain and sprocket or belt and timing gear, etc. The elliptical cycle 100 can employ a "fixed" or "free" rear wheel 108, as is known in the art. The elliptical cycle 100 can also employ a planetary gear hub or derailleur system having different gear ratios, as is known in the art.

Pedaling the elliptical cycle 100 as described above results in the operator's foot traveling in a shape that can be described as generally elliptical or ovate. Propulsion using an elliptical or ovate pedaling motion, as opposed to an up-and-down pedaling motion or a circular pedaling motion, has the advantage of better emulating a natural human running or walking motion. Further, an elliptical or ovate pedaling motion is a simpler and a more efficient means to power a cycle than is, for example, a vertical pumping motion. Moreover, the major axis of the ellipse in an elliptical or ovate pedaling motion can be much longer than the stroke length of a circular or vertical pumping pedaling motion, allowing the operator to employ a larger number of muscle groups over a longer range of motion during the pedal stroke than he or she could employ in a circular or up and down pedaling motion.

Referring now to FIGS. 6A-6E, the pivoting foot platform will now be described in more detail. An embodiment of the pivoting foot platform includes a foot platform assembly 200 connected to a foot platform pivot assembly 300 which is in turn coupled to a drive arm 102. The foot platform assembly 200 may include a foot platform 201 that is designed to receive the rider's foot. The pivoting foot platform 201 is pivotally coupled to one of the first and second foot links, drive arms 102 so as to allow angular travel of the pivoting foot platform 201. The foot platform 201, the drive arm 102, the foot platform assembly 200, and/or the foot platform pivot assembly 300 include one or more features to limit the angular travel of the pivoting foot platform 201. At a forward end of the foot platform 201 is a front bumper 202. The front bumper 202 operates to engage the drive arm 102 when the foot platform assembly 200 has reached its forward-most end of its range of motion. Alternate embodiments of the foot platform assembly 200 eliminate the front bumper 202 and use the foot platform 201 as the range of motion limiter. Other embodiments provide for a front bumper 202 made of hard material. Other embodiments provide for a front bumper 202 made from a compliant material, such as rubber, or a spring and/or a damper or a combination thereof. Other embodiments may provide for an adjustable front bumper 202 so that the foot platform assembly 200 range of motion can be adjusted. Other embodiments can provide for range of motion limiters to lock out and disable travel in the forward, rearward or both directions. Other embodiments may use a combination of the above, but situate the front bumper 202 into another part of the foot platform assembly 200 or foot platform pivot assembly 300 and not onto the drive arm 102 or only partially on the drive arm 102. The pivoting foot platform 201 could also incorporate a spring return to further improve predictable foot platform assembly 200 presentation within the limits. The illustrations provided are not exhaustive nor intended to limit the alternative embodiments that could be applied to result in the limitation of the range of motion for a pivoting foot platform.

The bottom of the foot platform 201 is connected to the foot platform bracket assembly 204. The foot platform bracket assembly 204 includes the rear bumper 203 and is pivotally connected to the foot platform pivot assembly 300 at the pivot bracket assembly 301. The rear bumper 203 operates to engage the pivot bracket assembly 300 when the foot platform assembly 200 has reached its rearward-most end of its range of motion. Alternate embodiments of the foot platform assembly 200 eliminate the rear bumper 203 and use the foot platform 201 as the range of motion limiter. Other embodiments provide for a rear bumper 203 made of hard material. Other embodiments provide for a rear bumper 203 made from a compliant material such as rubber, or a spring and/or a damper or a combination thereof. Other embodiments may provide for an adjustable rear bumper 203 so that the foot platform assembly 200 range of motion can be adjusted. Other embodiments may use a combination of the above but situate the rear bumper 203 into another part of the foot platform assembly 200 or foot platform pivot assembly 300 and/or onto the drive arm 102. The illustrations provided are not exhaustive nor intended to be a limitation on the alternative embodiments that could be applied to result in the limitation of the range of motion for a pivoting foot platform.

The foot platform pivot assembly 300 includes the pivot bracket assembly 301, which is coupled to the foot platform assembly 200 at the foot platform bracket assembly 204, to a pivot axle 302 via a bearing 304, and to a pivot spring 303. The bearing 304 allows the pivot bracket assembly 301 and, therefore, the foot platform assembly 200 to pivot forward and rearward about the pivot axle 302. The pivot spring 303 operates to return the foot platform assembly 200 to a predictable and convenient position for the rider upon mounting the elliptical cycle 100.

The coupling mechanism between the foot platform pivot assembly 300 and the drive arm 102 may provide for a fixed coupling or may be movably coupled such that the location of the foot platform pivot assembly 300 on the drive arm 102 may be easily adjusted or selectively positionable along the first and second drive arms/foot links 102. FIG. 6A depicts one embodiment of a movable foot platform pivot assembly. In this embodiment, the foot platform pivot assembly 300 includes a bracket that can be loosened to allow the foot platform pivot assembly 300 to slide forward or rearward along the drive arm and be easily locked at a selected location. In this embodiment, the drive arm 102 has a scale printed on it to make it easier to accurately select the desired location for the foot platform pivot assembly 300 and keep the foot platform pivot assembly 300 locations consistent for both drive arms 102.

Figure 4A:
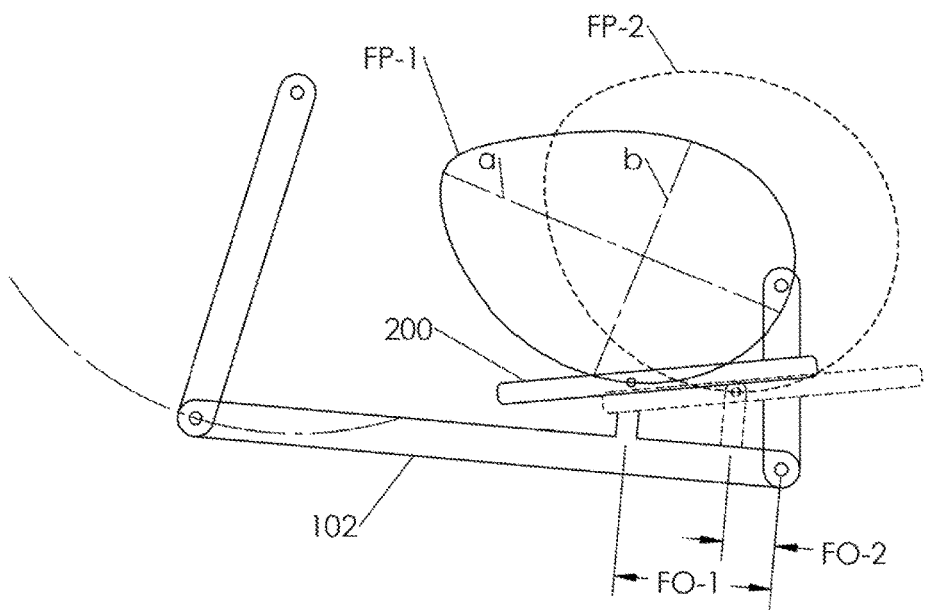
FIG. 4A is a side elevation view of one embodiment of a rocker crank mechanism with a short drive arm and a pivoting foot platform that shows the change in the foot path that results from moving the pivoting foot platform along the drive arm.

FIG. 4A depicts one embodiment of a rocker crank mechanism with a short drive arm 102 and pivoting foot platform that can be positioned in different locations on the drive arm. A benefit of adjusting the foot platform is it modifies the vertical component "b-axis" of the foot path FP. Foot path 1 FP-1 is the path of travel that the rider's foot would take on this elliptical mechanism with the foot platform located at foot offset 1 FO-1. Foot path 2 FP-2 is the path of travel that the rider's foot would take on this elliptical mechanism with the foot platform located at foot offset 2 FO-2. Foot offset 1 FO-1 is further forward on the drive arm so foot path 1 FP-1 has a smaller vertical component "b-axis" when compared to foot path 2 FP-2.

Figure 4B:
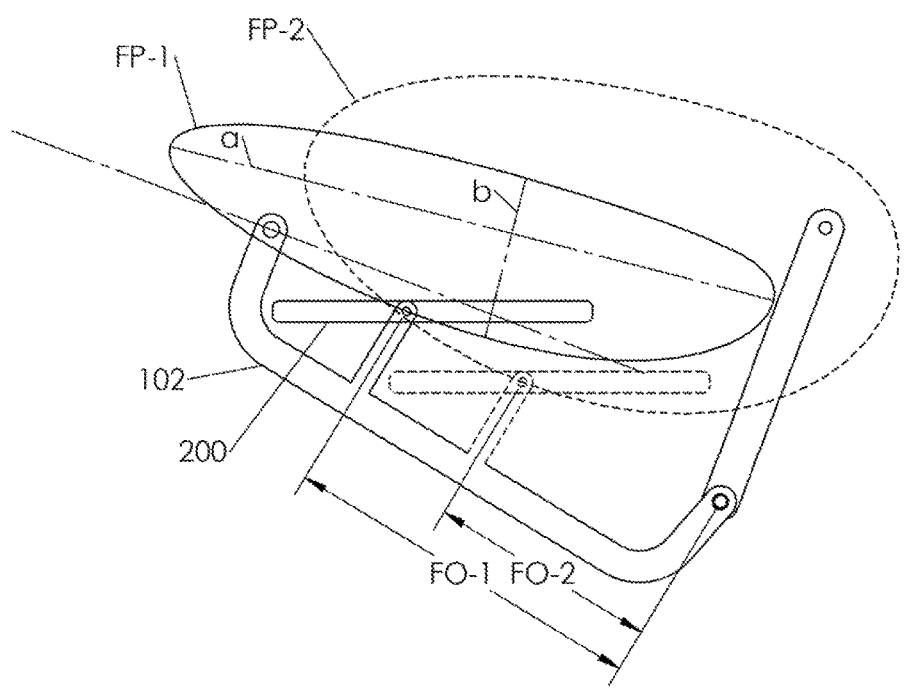
FIG. 4B is a side elevation view of one embodiment of a slider crank mechanism with a short drive arm and a pivoting foot platform that shows the change in the foot path that results from moving the pivoting foot platform along the drive arm.

FIG. 4B depicts one embodiment of a slider crank mechanism with a short drive arm 102 and pivoting foot platform that can be positioned in different locations on the drive arm. As with FIG. 4A, because foot offset 1 FO-1 is further forward on the drive arm so foot path 1 FP-1 has a smaller vertical component "b-axis" when compared to foot path 2 FP-2.

The adjustable pivoting foot platforms in FIGS. 6A, 4A and 4B can be coupled to the drive arm through a variety of coupling mechanisms, including, but not limited to, clamps, screws, brackets, pins, and may have additional features to address issues including, but not limited to, facilitating the ease of adjusting the location of the foot platform, reducing noise, and improving the manufacturability of the device.

Similarly, the foot platform assembly 200 may be designed in such a manner such that it remains in a fixed position relative to the foot platform pivot assembly 300 or so that its position can be easily adjusted relative to the foot platform pivot assembly 300. FIG. 6B depicts one embodiment of an adjustable foot platform assembly 200. In this embodiment, the pivoting foot platform 201 includes an upper portion configured to come in contact with the operator's foot and a lower portion which is in contact with corresponding first and second drive arms/foot links 102 and the upper portion of the pivoting foot platform 201 is selectively positionable in more than one position relative to the lower portion of the pivoting foot platform 201. The foot platform 201 has two slots running in parallel along a portion of its length. Inside the slots are mechanisms for either clamping or loosening the foot platform 201 from the foot platform bracket assembly 204. Loosening the clamping mechanisms allows the foot platform 201 to slide back and forth about the foot platform bracket assembly 204 until a desired setting is reached and then be attached at that setting. In this embodiment, each foot platform 201 is marked with the same numbers in the same positions on the slot to improve the accuracy of foot platform 201 adjustment and facilitate keeping the location of the foot platforms 201 relative to the foot platform bracket 204 consistent, and the slots are configured with detents that interlock with the bracket 204 via the clamping mechanisms when engaged to further improve locational repeatability and prevent slipping of the foot platform in the event the clamping mechanisms are not sufficiently tightened.

Alternate embodiments could include any one of a variety of methods known in the art for selectively securing and loosening the foot platform 201 in different positions relative to the foot platform bracket 204, or for selectively securing and loosening the foot platform bracket 204 in different positions relative to the foot platform pivot assembly 300 or any combination of the three. Alternative methods for achieving this adjustability include, but are not limited to, using a plurality of holes, rail systems, channel systems or slot systems in conjunction with any number of mechanical fasteners or clamping mechanisms to selectively secure and loosen elements of the foot platform assembly 200 and/or the foot platform pivot assembly 300 so they can be positioned relative to each other.

Figure 2A:
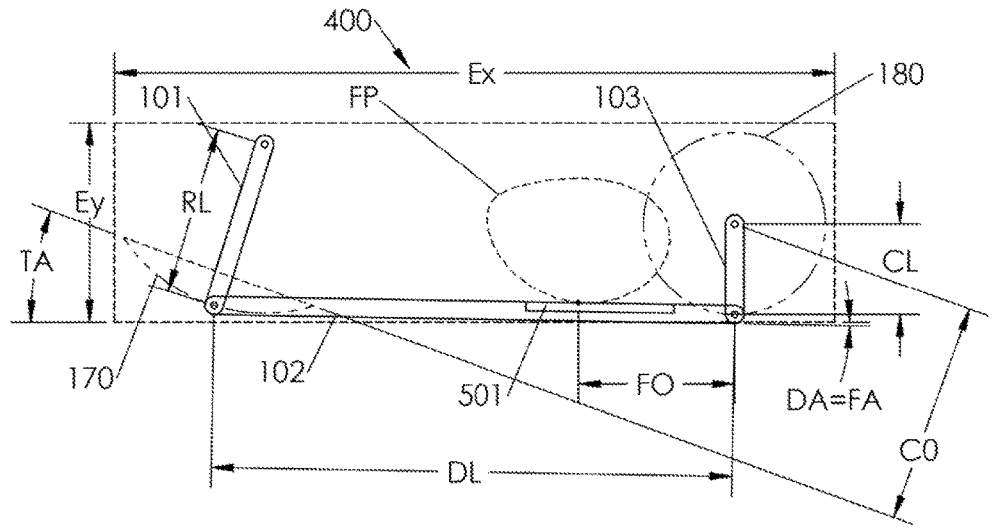
FIG. 2A is a side elevation view of one embodiment of a rocker crank mechanism with a long drive arm and a fixed foot platform that shows the mechanism at the bottom of the power stroke and the foot path that results from actuating the mechanism.
Figure 2B:
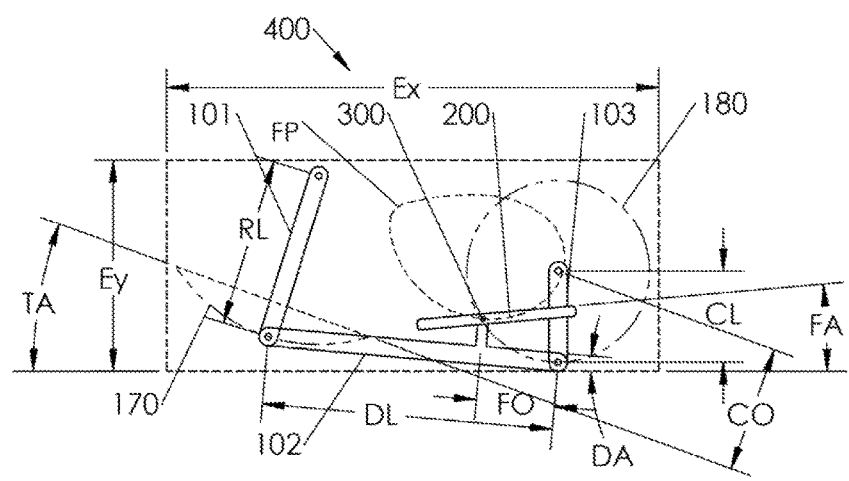
FIG. 2B is a side elevation view of one embodiment of a rocker crank mechanism with a short drive arm and a pivoting foot platform that shows the mechanism at the bottom of the power stroke and the resulting foot path that is substantially similar to the one in FIG. 2A.
Figure 2C:
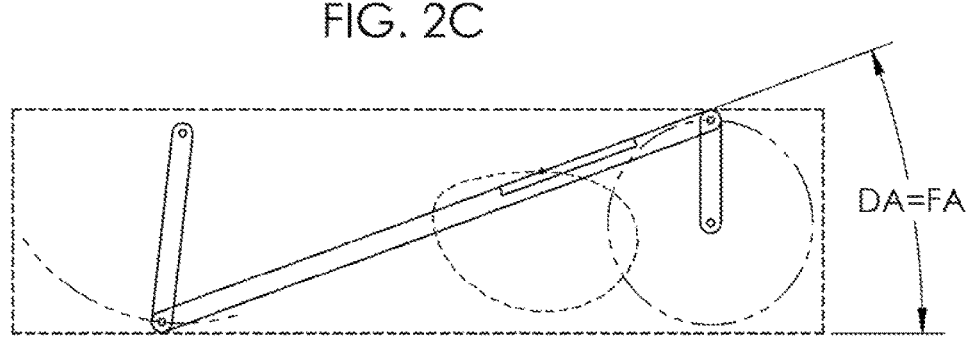
FIG. 2C is a side elevation view of the mechanism depicted in FIG. 2A that shows the mechanism at the top of the power stroke.

Turning now to FIGS. 2A-2D and 3A-3D, the advantages of a pivoting foot platform are depicted. FIGS. 2A and 2C show one embodiment of a rocker crank elliptical mechanism with a fixed foot platform. In this embodiment, drive arm 102 is pivotally connected at its forward end to rocker arm 101 and at its rearward end to crank arm 103. When the rider applies propulsive force to the mechanism, rocker arm 101 reciprocates back and forth along arc 170 and crank arm 103 rotates in circular motion 180. Foot path FP is the generally elliptical or ovate path of travel that the rider's foot will move through during the pedaling process. It is determined by foot offset FO, crank arm length CL, drive arm length DL, rocker arm length RL, crank pivot offset CO, and track angle TA. In this embodiment, fixed foot platform 501 is rigidly connected to drive arm 102 such that drive arm angle DA equals foot angle FA. Horizontal envelope Ex shows the forward and rearward extent of the moving parts of the depicted mechanism. Vertical Envelope Ey shows the upper and lower extent of the moving parts of the depicted mechanism. In FIG. 2A, the mechanism is at the bottom of the power stroke. In FIG. 2C, the mechanism is at the top of the power stroke.

Figure 2D:
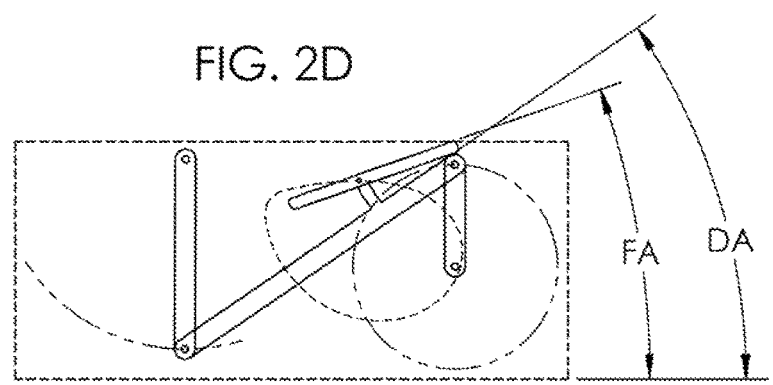
FIG. 2D is a side elevation view of the mechanism depicted in FIG. 2B that shows the mechanism at the top of the power stroke.

FIGS. 2B and 2D depict an embodiment of a rocker crank elliptical mechanism with a pivoting foot platform. This embodiment has the same functional structure of a rocker arm 101, a drive arm 102, and a crank arm 103, and substantially similar foot paths FP as the embodiments in FIGS. 2A and 2C. However, drive arm length DL in FIGS. 2B and 2D is 44% shorter than drive arm length DL in FIGS. 2A and 2C and the horizontal envelope Ex in FIGS. 2B and 2D is 32% shorter than the horizontal envelope Ex in FIGS. 2A and 2C. This significant reduction in drive arm length DL and horizontal envelope Ex enables the use of a much smaller frame 106 to support the elliptical mechanism in FIGS. 2B and 2D than that in FIGS. 2A and 2C while providing substantially similar riding experiences and benefits to the rider.

This reduction in frame size and corresponding cost savings and performance improvements are primarily attributable to the use of a pivoting foot platform in place of a rigid foot platform. As shown in FIGS. 2A and 2C, when using a rigid foot platform, the foot angle FA is directly tied to the drive arm angle DA. As shown in FIGS. 2B and 2D, with a pivoting foot platform, the foot angle FA is decoupled from the drive arm angle DA. This enables the use of shorter drive arms 102 without subjecting the rider to extreme foot platform angles that are uncomfortable and stressful on the rider's knee and ankle joints or Achilles tendon because the rider can dynamically determine the foot angle FA throughout the pedal stroke independent of the drive arm angle DA. For example, in FIG. 2B, the minimum drive arm angle DA is slightly negative while the foot angle FA remains positive, allowing the rider to avoid the strain to the Achilles tendon discussed above. Similarly, in FIG. 2D, pivoting the foot platform allows the foot angle FA to be less extreme that the drive angle DA, reducing any knee and/or ankle discomfort.

Figure 3A:
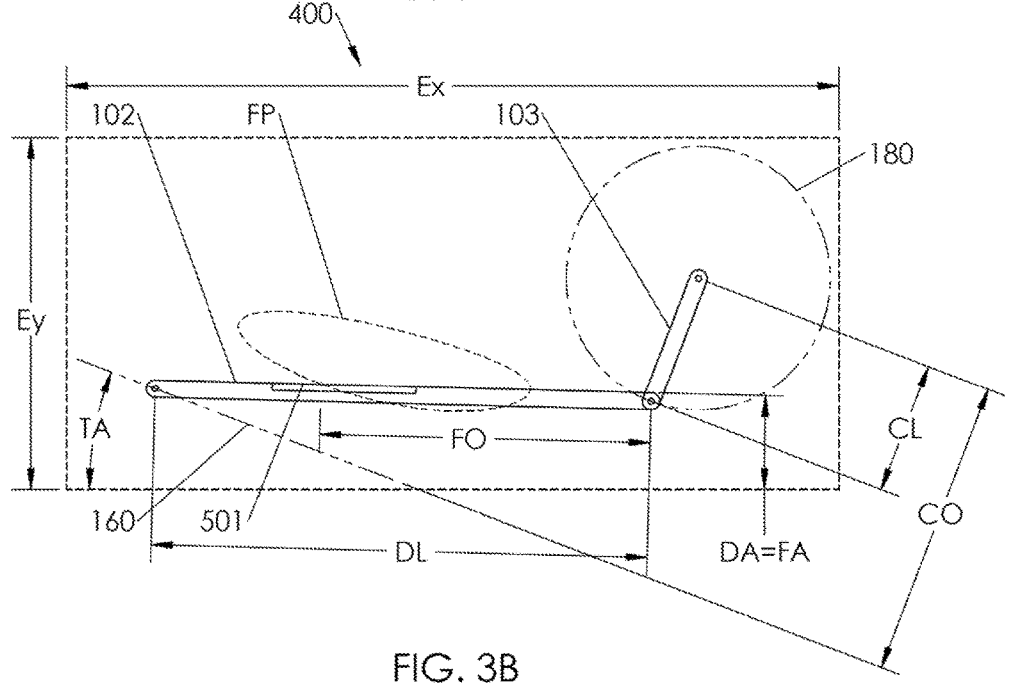
FIG. 3A is a side elevation view of one embodiment of a slider crank mechanism with a long drive arm and a fixed foot platform that shows the mechanism at the bottom of the power stroke and the foot path that results from actuating the mechanism.
Figure 3B:
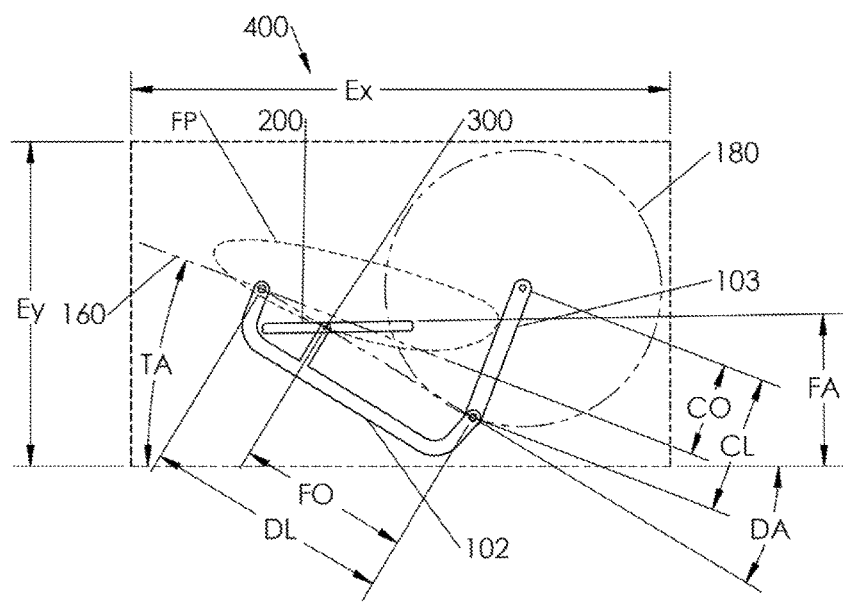
FIG. 3B is a side elevation view of one embodiment of a slider crank mechanism with a short drive arm and a pivoting foot platform that shows the mechanism at the bottom of the power stroke and the resulting foot path that is substantially similar to the one in FIG. 3A.
Figure 3C:
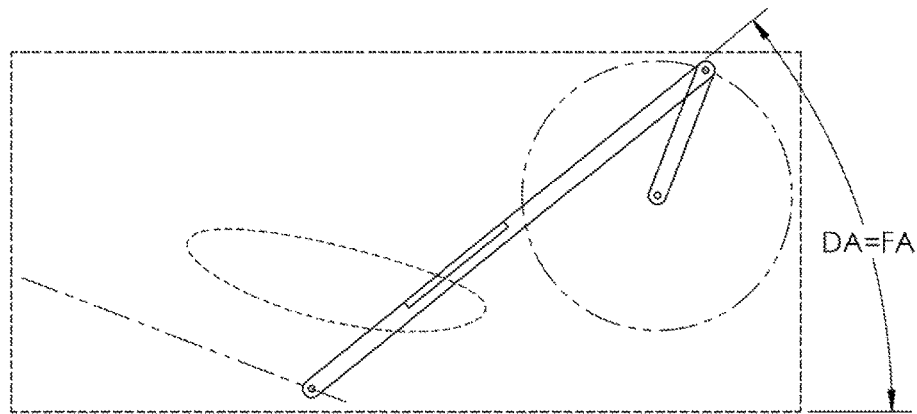
FIG. 3C is a side elevation view of the mechanism depicted in FIG. 3A that shows the mechanism at the top of the power stroke.

FIGS. 3A-3D show a similar benefit of pivoting foot platforms on elliptical cycles employing slider crank mechanisms. FIGS. 3A and 3C show one embodiment of a slider crank elliptical mechanism with a fixed foot platform. In this embodiment, drive arm 102 is coupled at its forward end to a guide track system 160 and at its rearward end to a crank arm 103. When the rider applies propulsive force to the mechanism, the front end of the drive arm 102 travels back and forth along the guide track system 160 while the crank arm 103 rotates in a circular motion 180. As in FIGS. 2A-2D above, foot path FP is the elliptical or ovate path of travel that the rider's foot will move through during the pedaling process and is determined by foot offset FO, crank arm length CL, drive arm length DL, crank pivot offset CO and track angle TA. In the embodiment depicted in FIGS. 3A and 3C, fixed foot platform 501 is rigidly connected to drive arm 102 such that drive arm angle DA equals foot angle FA. Horizontal envelope Ex shows the forward and rearward extent of the moving parts of the depicted mechanism. Vertical Envelope Ey shows the upper and lower extent of the moving parts of the depicted mechanism. In FIG. 3A, the mechanism is at the bottom of the power stroke. In FIG. 3C, the mechanism is at the top of the power stroke.

Figure 3D:
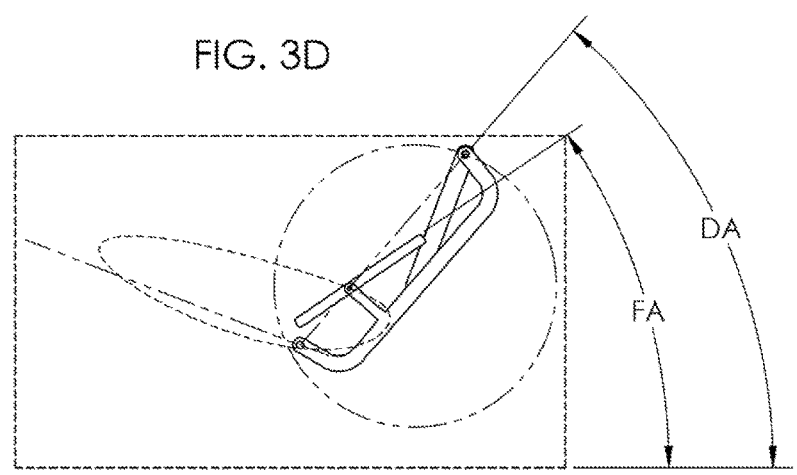
FIG. 3D is a side elevation view of the mechanism depicted in FIG. 3B that shows the mechanism at the top of the power stroke.

FIGS. 3B and 3D depict an embodiment of a slider crank elliptical mechanism with a pivoting foot platform. This embodiment has the same functional structure of a drive arm 102, guide tracks 160 and a crank arm 103, and substantially similar foot paths FP as the embodiments in FIGS. 3A and 3C. However, drive arm length DL in FIGS. 3B and 3D is 50% shorter than drive arm length DL in FIGS. 3A and 3C and the horizontal envelope Ex in FIGS. 3B and 3D is 30% shorter than the horizontal envelope Ex in FIGS. 3A and 3C. As with FIGS. 2A-2D above, this significant reduction in drive arm length DL and horizontal envelope Ex enables the use of a much smaller frame 106 to support the elliptical mechanism in FIGS. 3B and 3D than that in FIGS. 3A and 3C while providing substantially similar riding experiences and benefits to the rider.

Again, this reduction in frame size and corresponding cost savings and performance improvements are primarily attributable to the use of a pivoting foot platform in place of a rigid foot platform for the same reason and with a similar effect as with FIGS. 2B and 2D above. Namely, that the pivoting foot platform decouples the foot angle FA from the drive arm angle DA, enabling the use of shorter drive arms 102 without subjecting the rider to extreme foot platform angles that are uncomfortable and stressful on the rider's knee and ankle joints or Achilles tendon because the rider can dynamically determine the foot angle FA throughout the pedal stroke independent of the drive arm angle DA.

As discussed above, one element that determines the shape of the ovate or generally elliptical path is the foot offset FO. Keeping the other elements the same, changing the position of the foot platform assembly 200 on the drive arm 102 will change the shape of the ovate or elliptical foot path FP. Moving the foot platform to the rear on the drive arm towards the crank arm increases the vertical component "b-axis" of the ovate motion. Moving the foot platform forward on the drive arm decreases the vertical component "b-axis" of the ovate motion. Moving the foot platform along the drive arm in either direction does not materially change the horizontal component "a-axis" of the ovate motion.

Figure 5A:
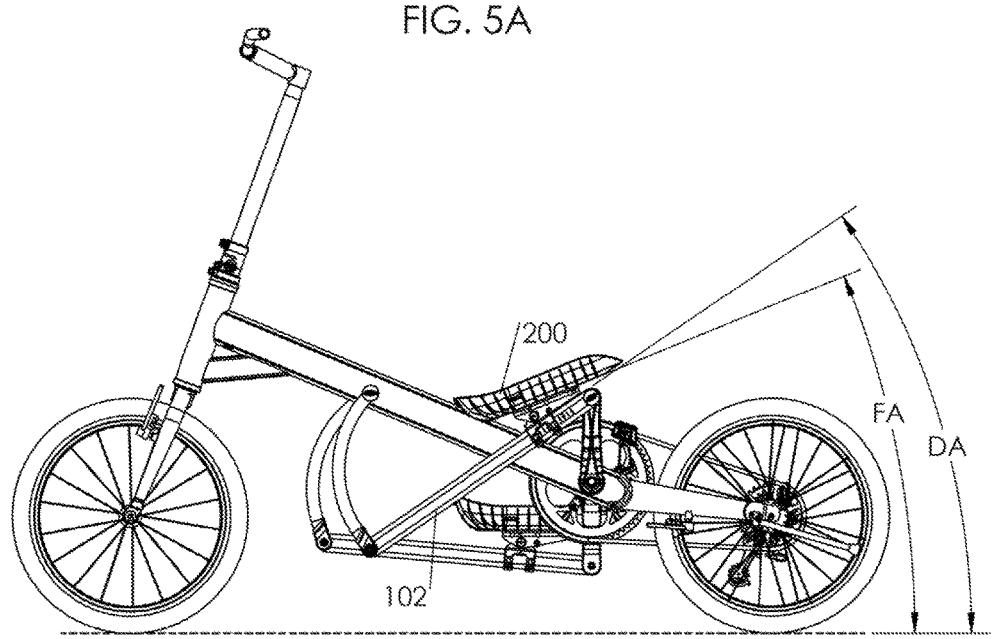
FIG. 5A is a side elevation view of the elliptical cycle depicted in FIG. 1 where the left drive arm is at the top of the power stroke.
Figure 5B:
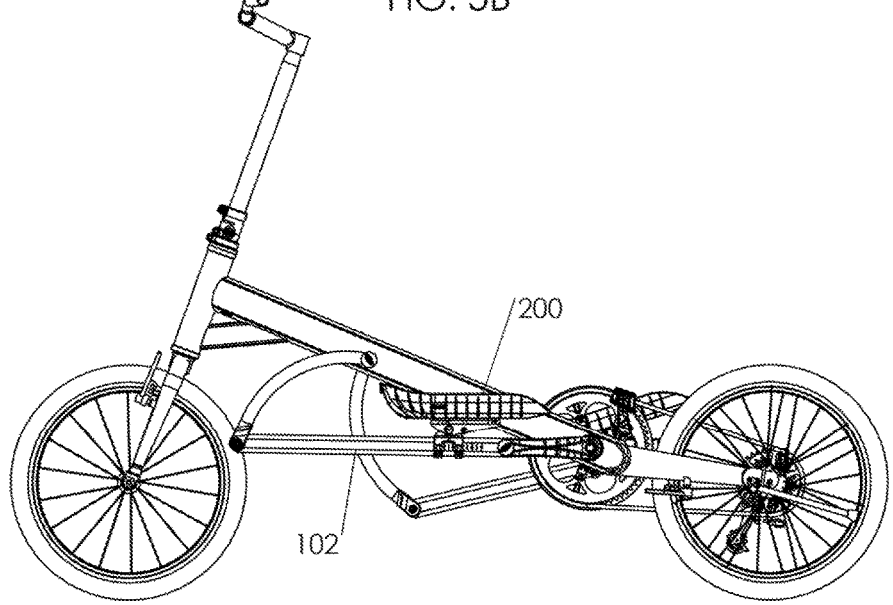
FIG. 5B is a side elevation view of the elliptical cycle depicted in FIG. 1 where the left drive arm is in the middle of the power stroke.
Figure 5C:
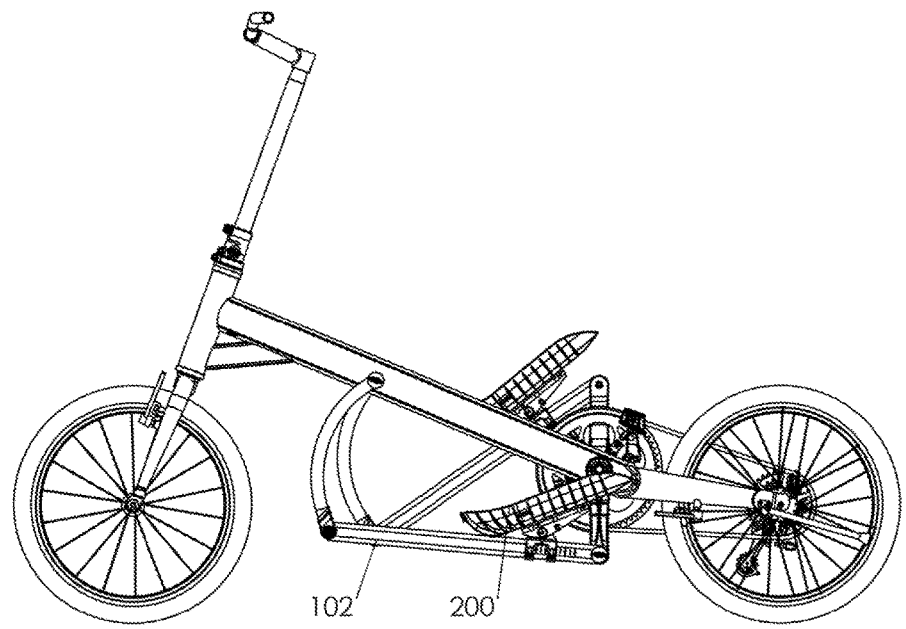
FIG. 5C is a side elevation view of the elliptical cycle depicted in FIG. 1 where the left drive arm is at the bottom of the power stroke.

FIGS. 5A-5C depict one embodiment of a rear-drive elliptical cycle with a rocker crank mechanism, short drive arm and pivoting foot platform. FIG. 5A depicts this embodiment with the left drive arm 102 at the top of the power stroke where the maximum drive arm angle DA occurs. The foot platform assembly 200 has been pivoted backward to engage a rear range of motion limiter. This position provides a flatter foot angle FA for the rider and enables the rider to transition power through his heel directly to the drive arm.

FIG. 5B depicts the same rear-drive elliptical cycle with the left drive arm 102 in the middle of the power stroke. The foot platform assembly 200 has been pivoted to be parallel to the drive arm 102 to facilitate providing power to the cycle. Alternatively, the foot platform assembly 200 could be rotated back onto the rear range of motion limiter to provide a more stable riding experience while the rider is coasting.

FIG. 5C depicts the same rear-drive elliptical cycle with the left drive arm 102 at the bottom of the power stroke. The foot platform assembly 200 has been pivoted forward to engage a front range of motion limiter. This position provides a more comfortable foot angle where the Achilles tendon is not in tension and the angle of the foot enables the rider to more easily apply power in a rearward direction.

Figure 1C:
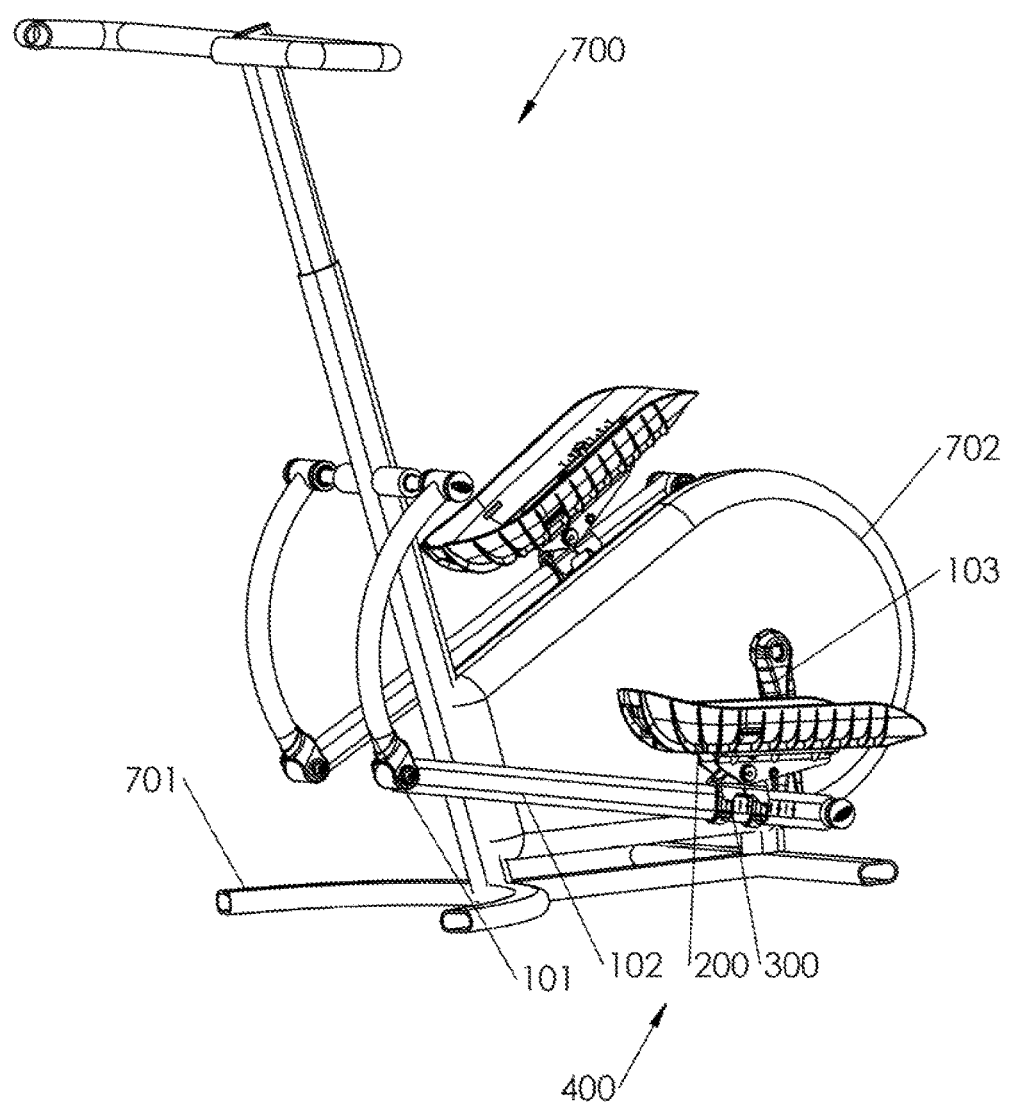
FIG. 1C is a perspective view of an embodiment of an indoor elliptical trainer with a pivoting foot platform.

With reference to FIG. 1C, the pivoting foot platform assemblies 200 are applied to a stationary elliptical exercise machine 700. Like reference numbers to the elements/features shown and described above with respect to FIGS. 1A and 2A-6D, the subject matter of which is incorporated herein, are shown in FIG. 1C. The stationary elliptical exercise machine 700 includes a frame 701, first and second foot links 102 operably coupled to a stationary driven mechanism 702; each of the first and second foot links 102 including a pivoting foot platform assembly 200 for receiving an operator's foot, said pivoting foot receiving platform assembly 200 pivotally coupled to one of the first and second foot links 102 so as to allow angular travel of the pivoting foot platform.

With reference to FIG. 1D, the pivoting foot platform assemblies 200 are applied to an elliptically driven watercraft/apparatus 800. Like reference numbers to the elements/features shown and described above with respect to FIGS. 1A and 2A-6D, the subject matter of which is incorporated herein, are shown in FIG. 1D. The elliptically driven watercraft 800 includes a floating structure 801 suitable for use as a water-borne craft; a propulsion mechanism 802 coupled to the floating structure 801; first and second foot links 102 operably coupled to the propulsion mechanism 802 to transfer power to the propulsion mechanism 802 so as to propel the apparatus 800; each of the first and second foot links 102 including a pivoting foot platform assembly 200 for receiving an operator's foot, said pivoting foot receiving platform assembly 200 pivotally coupled to one of the first and second foot links 102 so as to allow angular travel of the pivoting foot platform.

In alternative embodiments of the stationary elliptical exercise machine 700 of FIG. 1C and the elliptically driven watercraft/apparatus 800 of FIG. 1D, the rocker crank mechanisms shown are replaced with slider crank mechanisms such as those shown and described with respect to FIG. 1B, FIGS. 3A-3D, and FIG. 4B, which is incorporated by reference herein.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. For example, all of the elliptical cycles and mechanisms disclosed herein have a generally elliptical or ovate foot path where the forward end of the horizontal axis of the ellipse or oval is above the rearward end of the horizontal axis of the ellipse or oval relative to the ground. Other embodiments of a rear-drive elliptical cycle employing pivoting foot platforms could be configured so that the foot path has the rearward end of the horizontal axis of the ellipse or oval situated equal with or above the forward end. Such embodiments, and others, are included within the scope of the invention.

Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in any following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

We claim:

1. An apparatus, comprising:
   a frame;
   a drive wheel coupled to the frame;
   first and second foot links operably coupled to said drive wheel to transfer power to said drive wheel so as to propel the apparatus;
   each of said first and second foot links including a pivoting foot platform for receiving an operator's foot for travel in one of a generally elliptical and generally ovate foot path, said pivoting foot platform pivotally coupled to one of said first and second foot links so as to allow angular travel of the pivoting foot platform,
   wherein said pivoting foot platform contains an upper portion configured to come in contact with an operator's foot and a lower portion which is in contact with corresponding first and second foot links and the upper portion of the pivoting foot platform is selectively positionable in more than one position relative to the lower portion of the pivoting foot platform.

2. The apparatus of claim 1, wherein each of said pivoting foot platforms is selectively positionable along corresponding first and second foot links.

3. An apparatus, comprising:
   a frame;
   a drive wheel coupled to the frame;
   first and second foot links operably coupled to said drive wheel to transfer power to said drive wheel so as to propel the apparatus;
   each of said first and second foot links including a pivoting foot platform for receiving an operator's foot for travel in one of a generally elliptical and generally ovate foot path, said pivoting foot platform pivotally coupled to one of said first and second foot links so as to allow angular travel of the pivoting foot platform, and includes an upper portion configured to come in contact with an operator's foot and a lower portion which is in contact with corresponding first and second foot links and the upper portion of the pivoting foot platform is selectively positionable in more than one position relative to the lower portion of the pivoting foot platform.

4. An apparatus, comprising:
   a frame;
   a drive wheel coupled to the frame;
   first and second foot links operably coupled to said drive wheel to transfer power to said drive wheel so as to propel the apparatus;
   each of said first and second foot links including a pivoting foot platform for receiving an operator's foot for travel in one of a generally elliptical and generally ovate foot path, said pivoting foot platform pivotally coupled to one of said first and second foot links so as to allow angular travel of the pivoting foot platform, and said pivoting foot platform includes an upper portion which is configured to come in contact with the operator's foot and a lower portion which is in contact with corresponding first and second foot links and the upper portion of the pivoting foot platform is selectively positionable in more than one position relative to the lower portion of the pivoting foot platform.

5. An apparatus, comprising:
   a frame having a drive wheel rotatably supported thereupon, and a pivot axis defined thereupon;
   first and second foot links, each of said first and second foot links having a first end, a second end, a pivoting foot platform that is pivotally coupled to one of said first and second foot links so as to allow angular travel of the pivoting foot platform, and, wherein said pivoting foot platform includes an upper portion which is configured to come in contact with the operator's foot and a lower portion which is in contact with corresponding first and second foot links and the upper portion of the pivoting foot platform is selectively positionable in more than one position relative to the lower portion of the pivoting foot platform;
   a coupler assembly which is in mechanical communication with said pivot axis and with a first end of each of said first and second foot links, said coupler assembly being operative to direct said first ends of said first and second foot links in an arcuate path of travel;
   a foot link guide supported by said frame, said guide being operable to engage a second end of each of said first and second foot links, and to direct said second ends along a reciprocating path of travel;
   a power transfer linkage in mechanical communication with said coupler assembly and with said drive wheel; whereby when the first end of one of said first and second foot links travels in said arcuate path and the second end of that first and second foot links travels in said reciprocal path, an operator's foot supported thereupon for travel in one of a generally elliptical and generally ovate foot path, and said power transfer linkage transfers power from said coupler assembly to said drive wheel, so as to supply propulsive power thereto.

6. The apparatus of claim 5, where said pivoting foot platform is selectively positionable in more than one location along corresponding first and second foot links.

7. An apparatus, comprising:
   a frame having a drive wheel rotatably supported thereupon, and a pivot axis defined thereupon;

first and second foot links, each of said first and second foot links having a first end, a second end, a pivoting foot receiving platform that is pivotally coupled to one of said first and second foot links so as to allow angular travel of the pivoting foot platform, and said pivoting foot platform is selectively positionable in more than one location along corresponding first and second foot links and includes an upper portion which is in contact with the operator's foot and a lower portion which is in contact with corresponding first and second foot links and the upper portion of the pivoting foot platform is selectively positionable in more than one position relative to the lower portion of the pivoting foot platform;

a coupler assembly which is in mechanical communication with said pivot axis and with a first end of each of said first and second foot links, said coupler assembly being operative to direct said first ends of said first and second foot links in an arcuate path of travel;

a foot link guide supported by said frame, said guide being operable to engage a second end of each of said first and second foot links, and to direct said second ends along a reciprocating path of travel;

a power transfer linkage in mechanical communication with said coupler assembly and with said drive wheel; whereby when the first end of one of said first and second foot links travels in said arcuate path and the second end of one of said first and second foot links travels in said reciprocal path, an operator's foot supported thereupon for travel in one of a generally elliptical and generally ovate foot path, and said power transfer linkage transfers power from said coupler assembly to said drive wheel, so as to supply propulsive power thereto.

8. The apparatus of claim 7, wherein one or more features limits the angle of said pivoting foot platforms.

9. An apparatus, comprising:
a frame having a drive wheel rotatably supported thereupon, and a pivot axis defined thereupon;
first and second foot links, each of said first and second foot links having a first end, a second end, a pivoting foot receiving platform that is pivotally coupled to one of said first and second foot links so as to allow angular travel of the pivoting foot platform, and said pivoting foot platform includes an upper portion which is configured to come in contact with the operator's foot and a lower portion which is in contact with a corresponding foot link and the upper portion of the pivoting foot platform is selectively positionable in more than one position relative to the lower portion of the pivoting foot platform;
a coupler assembly which is in mechanical communication with said pivot axis and with a first end of each of said first and second foot links, said coupler assembly being operative to direct said first ends of said first and second foot links in an arcuate path of travel;
a foot link guide supported by said frame, said guide being operable to engage a second end of each of said first and second foot links, and to direct said second ends along a reciprocating path of travel;
a power transfer linkage in mechanical communication with said coupler assembly and with said drive wheel; whereby when the first end of one of said first and second foot links travels in said arcuate path and the second end of one of said first and second foot links travels in said reciprocal path, an operator's foot supported thereupon for travel in one of a generally elliptical and generally ovate foot path, and said power transfer linkage transfers power from said coupler assembly to said drive wheel, so as to supply propulsive power thereto.

10. An apparatus, comprising:
a floating structure suitable for use as a water-borne craft;
a propulsion mechanism coupled to the floating structure;
first and second foot links operably coupled to the propulsion mechanism to transfer power to said propulsion mechanism so as to propel the apparatus;
each of said first and second foot links including a pivoting foot platform for receiving an operator's foot for travel in one of a generally elliptical and generally ovate foot path, said pivoting foot receiving platform pivotally coupled to one of said first and second foot links so as to allow angular travel of the pivoting foot platform,
wherein said pivoting foot platform includes an upper portion which is configured to come in contact with the operator's foot and a lower portion which is in contact with corresponding first and second foot links and the upper portion of the pivoting foot platform is selectively positionable in more than one position relative to the lower portion of the pivoting foot platform.

11. The apparatus of claim 10, further including one or more features to limit the angular travel of said pivoting foot platform.

12. The apparatus of claim 10, where said pivoting foot platform is selectively positionable in more than one location along corresponding first and second foot links.

13. The apparatus of claim 11, wherein said pivoting foot platform is selectively positionable in more than one location along corresponding first and second foot links.

14. An apparatus, comprising:
a floating structure suitable for use as a water-borne craft with a pivot axis defined thereupon;
a propulsion mechanism coupled to the floating structure;
first and second foot links, each of said first and second foot links having a first end, a second end and a foot receiving portion defined thereupon, wherein said foot receiving portion includes a pivoting foot platform for receiving an operator's foot, said pivoting foot platform pivotally coupled to one of said first and second foot links so as to allow angular travel of the pivoting foot platform and said pivoting foot platform includes an upper portion which is in contact with the operator's foot and a lower portion which is in contact with a corresponding foot link and the upper portion of the pivoting foot platform is selectively positionable in more than one position relative to the lower portion of the pivoting foot platform;
a coupler assembly that is in mechanical communication with said pivot axis and with a first end of each of said first and second foot links, said coupler assembly being operative to direct said first ends of said first and second foot links in an arcuate path of travel;
a foot link guide supported by said frame, said guide being operable to engage a second end of each of said first and second foot links, and to direct said second ends along a reciprocating path of travel;
a power transfer linkage in mechanical communication with said coupler assembly and with said propulsion mechanism, whereby when the first end of one of said first and second foot links travels in said arcuate path and the second end of one of said first and second foot links travels in said reciprocal path, an operator's foot supported thereupon for travel in one of a generally elliptical and generally ovate foot path, and said power transfer linkage transfers power from said coupler assembly to said propulsion mechanism, so as to supply propulsive power thereto.

15. The apparatus of claim 14, further including one or more features to limit the angular travel of said pivoting foot platform.

16. The apparatus of claim 14, where said pivoting foot platform is selectively positionable in more than one location along corresponding first and second foot links.

17. The apparatus of claim 15, where said pivoting foot platform is selectively positionable in more than one location along corresponding first and second foot links.

18. An apparatus, comprising:
a frame having a pivot axis defined thereon, the frame configured to be supported on a floor;
first and second foot links, each of said first and second foot links including a first end, a second end and a pivoting foot receiving platform, said pivoting foot receiving platform pivotally coupled to one of said first and second foot links so as to allow angular travel of the pivoting foot platform, each of said pivoting foot platforms is selectively positionable in more than one location along corresponding first and second foot links;
a coupler assembly that is in mechanical communication said pivot axis and with the first end of each of said first and second foot links, said coupler assembly being operative to guide the first end of each of said first and second foot links in an arcuate path of travel;
a guide supported by the frame that is in mechanical communication with the second end of each of said first and second foot links, said guide being operative to guide the second end of each foot link along a reciprocating path of travel;
whereby when the operator engages said foot receiving platforms on said first and second foot links, the first end of each of said first and second foot links travels in an arcuate path and the second end of each of said first and second foot links travels in a reciprocating path, resulting in the operator's foot traveling in one of an elliptical path and an ovate path.

19. The apparatus of claim 18, further including one or more features to limit the angular travel of said pivoting foot platform.

20. The apparatus of claim 18, where said pivoting foot platform includes an upper portion which is in contact with the operator's foot and a lower portion which is in contact with corresponding first and second foot links and the upper portion of the pivoting foot platform is selectively positionable in more than one position relative to the lower portion of the pivoting foot platform.

21. The apparatus of claim 19, where said pivoting foot platform includes an upper portion which is in contact with the operator's foot and a lower portion which is in contact with corresponding first and second foot links and the upper portion of the pivoting foot platform is selectively positionable in more than one position relative to the lower portion of the pivoting foot platform.

22. An apparatus, comprising:
a frame having a pivot axis defined thereon, the frame configured to be supported on a floor;
first and second foot links, each of said first and second foot links including a first end, a second end and a pivoting foot receiving platform, said pivoting foot receiving platform pivotally coupled to one of said first and second foot links so as to allow angular travel of the pivoting foot platform, said pivoting foot receiving platform including an upper portion configured to be in contact with an operator's foot and a lower portion which is in contact with corresponding first and second foot links, and the upper portion of the pivoting foot platform is selectively positionable in more than one position relative to the lower portion of the pivoting foot platform;
a coupler assembly that is in mechanical communication said pivot axis and with the first end of each of said first and second foot links, said coupler assembly being operative to guide the first end of each of said first and second foot links in an arcuate path of travel;
a guide supported by the frame that is in mechanical communication with the second end of each of said first and second foot links, said guide being operative to guide the second end of each of said first and second foot links along a reciprocating path of travel;
whereby when the operator engages said foot receiving platforms on said first and second foot links, the first end of each of said first and second foot links travels in an arcuate path and the second end of each of said first and second foot links travels in a reciprocating path, resulting in the operator's foot traveling in one of an elliptical path and an ovate path.

23. The apparatus of claim 22, further including one or more features to limit the angular travel of said pivoting foot platform.

* * * * *